W. MARX.
Adjustable Knives for Cutting Hat-Boxes.

No. 155,457. Patented Sept. 29, 1874.

WITNESSES:
A. W. Almqvist
C. Sedgwick

INVENTOR:
W. Marx
BY
ATTORNEYS.

THE GRAPHIC CO. PHOTO-LITH. 39 & 41 PARK PLACE, N.Y.

UNITED STATES PATENT OFFICE.

WILLIAM MARX, OF NEW YORK, N. Y.

IMPROVEMENT IN ADJUSTABLE KNIVES FOR CUTTING HAT-BOXES.

Specification forming part of Letters Patent No. 155,457, dated September 29, 1874; application filed May 1, 1874.

*To all whom it may concern:*

Figure 1:
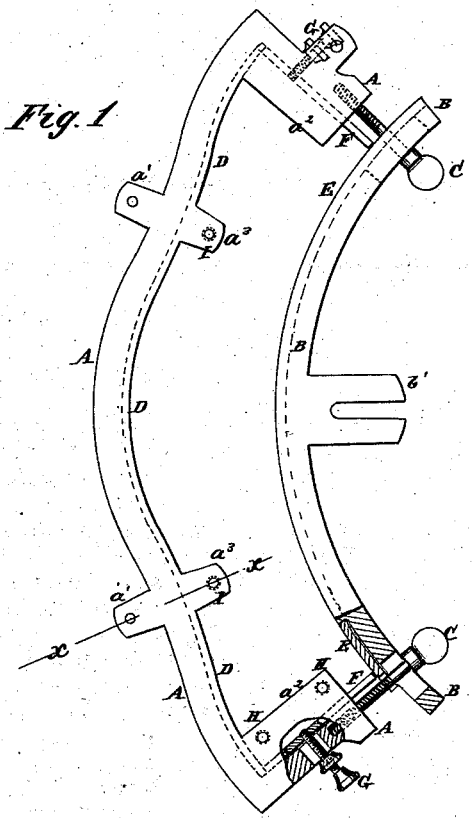
Figure 3:
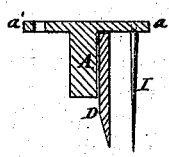
Figure 2:
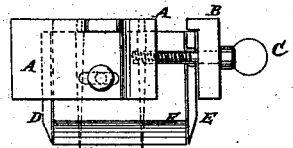
Figure 4:
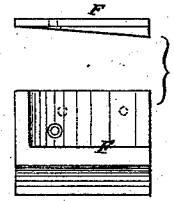
Figure 5:
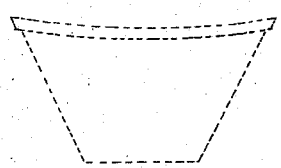

Be it known that I, WILLIAM MARX, of the city, county, and State of New York, have invented a new and useful Improvement in Adjustable Knife for Cutting Hat-Boxes, of which the following is a specification:

Figure 1 is a base view of my improved knife. Fig. 2 is an end view of the same. Fig. 3 is a detail section of the same, taken through the line $x\ x$, Fig. 1. Fig. 4 is an edge and side view of one of the detachable end knives. Fig. 5 represents a hat-box.

Similar letters of reference indicate corresponding parts.

My invention has for its object to furnish an improved knife for cutting out hat-boxes, which shall be so constructed as to enable a number of boxes to be cut at one operation, and which may be readily adjusted to cut larger or smaller boxes, as may be required.

The invention consists in the construction and arrangement of parts which will be hereinafter more fully described, and subsequently pointed out in the claim.

The frame of the knife is made in the general form of a segment of a ring, and in two parts, A B. The body of the part A is made with two slight scallops, as shown in Fig. 1, to give the required form to the box. The ends of the part A are bent inward, as shown in Fig. 1, in about the direction of radiuses to receive the end knives. The other part, B, is curved in the arc of a circle, and has slots formed in it near its ends to receive the hand-screws C, by which it is secured to the ends of the part A. The body and ends of the part A are made with outwardly-projecting lugs $a^1$, to receive the screws by which it is secured to the block by which it is operated, and the part B is made with an outwardly-projecting lug, $b'$, to receive the screw by which it is secured to the block. The lug $b'$ is slotted, so that the part B may be adjusted without moving the fastening-screw. D E are the long or side cutters, which are secured to the inner sides of the parts A B. The end cutters are detachable, rest against the flanges $a^2$, formed upon the ends of the part A, and are secured in place by hand-screws G, which pass in through the said ends, and screw into the said cutters. The part B is held against the end of the cutters F by the hand-screws C, the cutters F thus serving as stops to regulate the position of the part B. To one of the flanges $a^2$ are attached pins H, which puncture the straw-board, and thus gage the lap in forming the boxes. Upon the part A are formed two inwardly-projecting lugs, $a^3$, to which are attached pins I, which puncture the straw-board to receive the tapes for tying on the cover.

The knife is adjusted for cutting different-sized boxes by detaching the end knives F and replacing them with longer or shorter ones, as may be desired.

The shorter end knives F must have a wedge-shaped plate attached to their outer side to bring them into proper position to give the box the proper flare, and make the bottom the proper size.

Having thus described my invention, I claim as new and desire to secure by Letters Patent—

The adjustable knife-frame, consisting of the part A, carrying the fixed side cutter D and detachable end cutters F, and the movable part B, carrying the cutter E, and provided with adjusting-screws C C, all constructed as herein shown and described.

WILLIAM MARX.

Witnesses:
JAMES T. GRAHAM,
T. B. MOSHER.